(12) United States Patent
Xu et al.

(10) Patent No.: US 8,719,443 B2
(45) Date of Patent: May 6, 2014

(54) METHOD AND SYSTEM FOR I/O DRIVEN RATE ADAPTATION

(75) Inventors: Ying Xu, Emeryville, CA (US); Michelle Christine Munson, Berkeley, CA (US); Serban Simu, Oakland, CA (US)

(73) Assignee: Aspera, Inc., Emeryville, CA (US)

( * ) Notice: Subject to any disclaimer, the term of this patent is extended or adjusted under 35 U.S.C. 154(b) by 1009 days.

(21) Appl. No.: 12/718,233

(22) Filed: Mar. 5, 2010

(65) Prior Publication Data

US 2010/0228878 A1    Sep. 9, 2010

Related U.S. Application Data

(60) Provisional application No. 61/158,000, filed on Mar. 6, 2009.

(51) Int. Cl.
*G06F 15/16*    (2006.01)
(52) U.S. Cl.
USPC .......................................... 709/233; 709/235
(58) Field of Classification Search
None
See application file for complete search history.

(56) References Cited

U.S. PATENT DOCUMENTS

| | | | |
|---|---|---|---|
| 6,652,656 B2 * | 11/2003 | Kopacz et al. ................. | 118/728 |
| 6,701,372 B2 * | 3/2004 | Yano et al. ..................... | 709/232 |
| 7,206,855 B1 * | 4/2007 | Hamilton et al. .............. | 709/232 |
| 2003/0035373 A1 * | 2/2003 | Bass et al. ................... | 370/230.1 |
| 2005/0157648 A1 * | 7/2005 | Miller et al. ................... | 370/235 |
| 2009/0063698 A1 | 3/2009 | Xu et al. | |

FOREIGN PATENT DOCUMENTS

| | | |
|---|---|---|
| EP | 1341336 A1 | 9/2003 |
| WO | WO-2004/043129 A2 | 5/2004 |
| WO | WO-2010101650 A1 | 9/2010 |

OTHER PUBLICATIONS

"Circular buffer" Wikipedia, (Feb. 9, 2009), pp. 1-8.
"International Application Serial No. PCT/US2010/000673, Search Report mailed Jul. 9, 2010", 4 pgs.
"International Application Serial No. PCT/US2010/000673, Written Opinion mailed Jul. 9, 2010", 7 pgs.
Comer, D, et al., ""A rate-based congestion avoidance and control scheme for packet switched networks"", Proceedings of the International Conference on Distributed Computing Systems .Paris, Los Alamitos , IEEE Comp o Soc. Press , US LNKD-DOI:I0 .II09/ICDC, vol. CONF . 10, (May 28, 1990), pp. 390-397.
"International Application Serial No. PCT/US2010/000673, International Preliminary Report on Patentability mailed Sep. 15, 2011", 9 pgs.

* cited by examiner

*Primary Examiner* — John B. Walsh
(74) *Attorney, Agent, or Firm* — Schwegman, Lundberg & Woessner, P.A.

(57) ABSTRACT

Described is an I/O driven, feedback based rate control mechanism that allows a transfer session to self-adjust its transfer rate in response to the speed of the storage device at the destination. The described system may operate at the application layer, which makes cross-platform deployment an easier task.

17 Claims, 2 Drawing Sheets

METHOD AND SYSTEM FOR I/O DRIVEN RATE ADAPTATION

RELATED APPLICATIONS

This application claims priority to and incorporates by reference previously filed provisional application Ser. No. 61/158,000 filed on Mar. 6, 2009. This application is also related to and incorporates by reference the specifications of the following applications in their entirety: U.S. patent application Ser. No. 11/317,663, filed Dec. 23, 2005, entitled "BULK DATA TRANSFER"; and U.S. patent application Ser. No. 11/849,782, filed Sep. 4, 2007, entitled "METHOD AND SYSTEM FOR AGGREGATE BANDWIDTH CONTROL".

BACKGROUND

The typical workflow of a data transfer application involves reading data from the sender, sending data across a network, and eventually writing data onto the receiver-side storage device. Along this data path, multiple throughput bottlenecks could emerge. Ideally, a transfer session should be able to adjust its rate in response to all possible bottlenecks. Failure to adapt may render the session overdriving the bottlenecked devices, inducing high latency and packet losses.

It is well-known that network links along a transfer path, due to their limited capacity, could become bottlenecked. In the literature, there exists a large body of work focusing on designing adaptation mechanisms to efficiently utilize available link capacities (See, e.g., Lawrence S. Brakmo and Larry L. Peterson. TCP Vegas: end-to-end congestion avoidance on a global Internet. IEEE Journal on Selected Areas in Communications, 13(8):1465-80, October 1995; M. Allman, V. Paxson, and W. Stevens. TCP congestion control. RFC 2581, April 1999; and Frank P. Kelly, Aman Maulloo, and David Tan. Rate control for communication networks: Shadow prices, proportional fairness and stability. Journal of Operations Research Society, 49(3):237-252, March 1998). However, as high-speed networking gear is increasingly deployed, the bottleneck may not happen inside the network, but at the end-systems. In practice, it is common to observe that the storage device on the receiver-end cannot keep up with the data transfer speed. This calls for application level mechanisms that take consideration of the speed of the storage I/O when writing data onto it.

DETAILED DESCRIPTION

Described herein is an I/O driven, feedback based rate control mechanism that allows a transfer session to self-adjust its transfer rate in response to the speed of the storage device at the destination. Existing proposals which address similar issues mostly follow an allocation based approach (See, e.g., P. Shenoy and H M. Vin. Cello: A Disk Scheduling Framework for Next Generation Operating Systems. In Proceedings of ACM SIGMETRICS Conference, Madison, Wis., pages 44-55, June, 1998; Joel C Wu, Scott A. Banachowski, Scott A. Brandt: Hierarchical disk sharing for multimedia systems: Proceedings of NOSSDAV, 189-194, 2005; and Disc Nice User-level regulation of disk bandwidth, IPSJ Digital Courier, December 2007. Available at: http://www.jstage.jst-.go.jp/article/ipsjdc/3/0/3_800/_article). Specifically, they attempt to explicitly allocate, or reserve disk I/O bandwidth among running processes at the receiver, so that the resource usage of a process will not exceed a certain threshold. However, it is often difficult for an allocation-based mechanism to select a proper threshold. From an application standpoint, ideally it would like to utilize "all" available disk resources. But how much throughput the disk could handle at a given moment is often not explicit and time-variant. Moreover, implementing an allocation-based scheme usually requires changes inside the operating system (OS). As a result, these solutions are often platform dependent, which is difficult to be adopted by cross-platform applications such as bulk data transfer. In contrast, the system described herein may operate at the application layer, which makes cross-platform deployment an easy task. We present our I/O driven design below, and also discuss how it can be combined with other existing rate control mechanisms inside the FASP protocol (See U.S. patent application Ser. No. 11/317,663), for example, the FASP adaptive rate control and the FASP virtual link control (See U.S. patent application Ser. No. 11/849,742).

Description of I/O Driven Rate Adaptation

Figure 1:
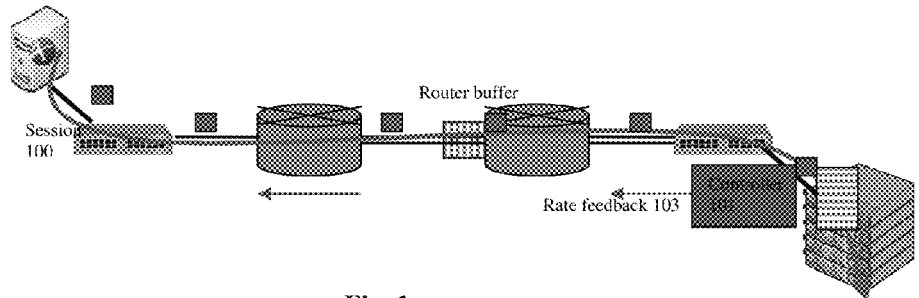
FIG. 1 illustrates an exemplary system for implementing I/O driven rate control.

FIG. 1 is a system level overview of the I/O driven rate control and how it can be employed by a data transfer session 100). Its main components include a rate controller 101, a receiver side ring buffer 102, and a messaging based feedback module 103. In particular, the ring buffer represents a buffer space maintained by the transfer application to temporarily store data after it arrives on the network interface, but before it is written to the storage device 104, which could be either a local hard drive, or a remotely mounted disk, or a clustered storage system.

In normal situations, the receiver side storage device can perform the "write" operation sufficiently fast, so that the ring buffer is either empty or only slightly full. However, it may not be able to keep up with the data arrival rate in high load circumstances. This could happen when the transfer session is configured with an ultra-high target rate, or when the storage device itself is busy serving many concurrent transfers or performing other pre-scheduled system tasks. Whenever the I/O speed of the storage device cannot keep up, data will be accumulated inside the ring buffer. Once the ring buffer becomes full, a certain number of packets have to be dropped. The appearance of packet losses may worsen the situation since the overhead of requesting retransmissions could consume large amount of CPU cycles, which could make the receiver-side storage device even slower in accepting incoming data. This in turn could induce more losses. As a consequence, accompanied with storage I/O slowdown is the occurrence of severe losses (usually higher than 20%) and greatly reduced transfer throughput.

In order to avoid overdriving, a feedback mechanism needs to be developed for the data transmitter to gracefully slow down in case the storage I/O becomes a bottleneck. In the mean time, this mechanism should also allow a session to track and fully utilize the throughput of storage I/O, unless the session is bottlenecked elsewhere. Previous works have proposed to adapt to the bottleneck link speed of a transfer path.

However, these proposals only consider bottlenecks inside the network and are oblivious to end-system bottlenecks.

A key part of the presently described mechanism is the use of ring buffer occupancy as an indication of the extent to which storage I/O is bottlenecked. Since the ring buffer is maintained by the transfer session itself, it is straightforward for the rate controller to measure its occupancy $\rho(t)$ at a given moment t. Assume the total size of the allocated ring buffer is B bytes, we divide the ring buffer occupancy into three regions. Specifically, if $\rho(t)B$ is smaller than $\rho_{min}B$ ($0 \le \rho_{min} \le 1$), it implies that the ring buffer is only slightly full and the storage is not a bottleneck. In such a case, there is no need to slow down. If $\rho(t)B$ is in between $\rho_{min}B$ and $\rho'B$ ($0 \le \rho_{min} < \rho' \le 1$), it signals that data starts to be accumulated inside the buffer. Although the absolute value of the transfer rate can still increase, its pace should be reduced. Once the ring buffer occupancy exceeds a threshold $\rho'B$, the transfer session should reduce its rate to avoid buffer overflow.

In the following, a two time-scale rate adaptation design is described that realizes the above objective. At a longer time scale, the rate controller constantly tracks the overall trend of I/O throughput, so as to stabilize the ring buffer occupancy at a target level of $\rho'B$. At the short time scale, the corresponding rate adaptation acts swiftly on sudden increase in ring buffer occupancy, which helps to prevent ring buffer from overflowing and thus minimize associated packet drops. Both rate adaptation mechanisms may be implemented in the rate controller 101 shown on FIG. 1.

Long Time-Scale Rate Adaptation

As mentioned previously, the I/O driven rate control is activated whenever the measured buffer occupancy $\rho(t)$ exceeds a minimum threshold $\rho_{min}$. When it is active, the long time scale adaptation mechanism continuously updates the transfer rate every time the ring buffer finishes writing a chunk of data onto the storage device (104). (The chunk of data could range from one block up to the whole ring buffer. In the current implementation, it is equal to 1/36 (2.8%) of the total ring buffer size, or 2048 data blocks.) In other words, whenever the receiver finishes one write operation, it triggers the rate controller to perform a long time scale rate update.

Denote T(t) as the effective rate update period, i.e., the duration between the last rate update (write completion) and t, the long time scale rate controller computes a new transfer rate x(t)' based on the current transfer rate x(t), T(t), the target ring buffer occupancy $\rho'B$, and the measured ring buffer occupancy $\rho(t)B$ The computed rate x(t)' is then sent back to the data transmitter through rate update messages (103), and will be used until the next rate update event occur.

$$x(t)' = x(t) + \frac{\gamma_{dist}}{T(t)}(\rho'B - \rho(t)B) \qquad \rho(t) \ge \rho_{min}$$

Based on the equation, the transfer rate x(t) decreases once $\rho(t)$ exceeds $\rho'$, in order to avoid overflowing the ring buffer. The amount of rate change is proportional to their difference, weighted by a weighing factor $\gamma_{disk}$. In practice, $\gamma_{disk}$ can be empirically set to 0.5. As long as the storage I/O is bottlenecked at the receiver, the adaptation mechanism periodically adjusts the transfer rate according to the ring buffer occupancy. The transfer rate is adjusted down once the measured ring buffer occupancy exceeds $\rho'B$, and more and more aggressively in order to contain the buffer occupancy below the full buffer size B, until the I/O throughput is not a bottleneck anymore ($\rho(t) < \rho_{min}$).

Note that performing rate updates after the ring buffer finishes a "write" operation helps to track the accurate trend of ring buffer occupancy. Usually, the write size is much larger than the size of a packet and multiple packets could arrive at the receiver in the middle of a "write" operation. This is particularly true during severe I/O slowdown. As a result, the instantaneous ring buffer occupancy may simply grow before a "write" operation completes. Performing multiple rate updates during a write operation does not account for the capability of the I/O device in draining data from the ring buffer, and therefore could yield overly conservative transfer rates due to overestimated buffer occupancy.

The above design directly compares the measured ring buffer occupancy $\rho(t)B$ with the target buffer occupancy $\rho'B$. An alternative is to compute a prediction on the ring buffer occupancy, and compare the predicted occupancy with the target occupancy. Specifically, denote w(t) as the duration of the most recent write operation, i.e., the duration between the last rate update and t, then the duration of writing the entire ring buffer onto storage, denoted as $\tau(t)$, can be estimated by $\tau(t)=B/\text{write\_size}*w(t)$. Then, $x(t)\rho(t)\tau(t)$ represents a prediction of the ring buffer occupancy when the next write operation completes, based on the current transfer rate x(t), ring buffer occupancy $\rho(t)$, and the most recent write duration w(t). In another embodiment, the rate update mechanism compares this value with the target ring buffer occupancy, and decides accordingly whether or not to decrease transfer rate in the subsequent update interval:

$$x(t)' = x(t) + \frac{\gamma_{dist}}{T(t)}(\rho'B - x(t)\rho(t)\tau(t)) \qquad \rho(t) \ge \rho_{min}$$

In both designs, the goal of the long time scale mechanism is to track the overall I/O throughput once it becomes a bottleneck, and stabilize the ring buffer occupancy at the target level $\rho'B$. This applies to a single transfer as well as multiple transfers. When there exist multiple transfers, each transfer session maintains its own ring buffer and responds to the changing buffer occupancy based on the same formula. Hence, it is expected that each session attains an equal share of the effective I/O bandwidth.

Short Time-Scale Rate Adaptation

Figure 2A:
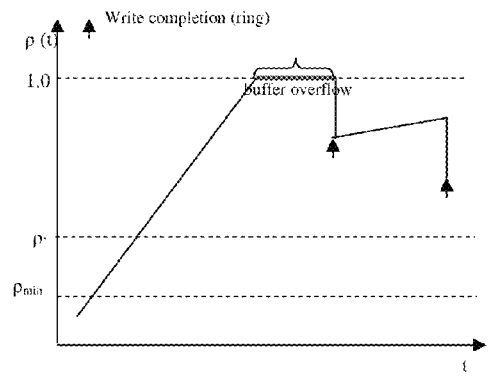
FIGS. 2(a) and 2(b) illustrate long time scale and short time scale adaptation mechanisms.
Figure 2B:
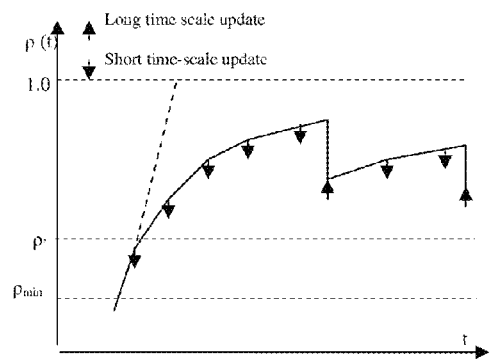

The long time scale design is efficient at tracking the overall trend of I/O slowdown. It alone may be insufficient, however, in dealing with sudden drops in I/O throughput and avoiding packet losses due to an abrupt rise in buffer occupancy. In particular, the duration of an I/O write operation varies dramatically. In case of sudden disk stall, the duration of the write operation is often in the order of seconds, during which ring buffer simply grows quickly towards its full size B. In such cases, the ring buffer often overflows before long time scale rate adaptation ever takes action to reduce the transfer rate. This is illustrated in FIG. 2 (a). During the overflow period (red line), the receiver have to drop incoming packets.

To respond to extended disk stall and sudden increase of ring buffer occupancy, a rate decrease mechanism is needed to operate at a shorter time scale, in between two consecutive long time scale rate updates. In one particular embodiment, the short time scale rate is adjusted every RTT(t), where RTT(t) is the currently measured network round-trip time, based on the following set of formulas.

$$x(t+RTT(t))=\alpha(t)x(t)\rho(t) \ge \rho_{min}$$

where $\alpha(t)$ decreases from $(1-\rho_{min})/(1-\rho')$ to 0 as $\rho(t)$ grows from $\rho_{min}$ to 1, that is:

$$\alpha(t)=[1-\rho(t)]/[1-\rho']$$

In contrast to the long time scale mechanism, the primary goal of the short time scale mechanism is to apply tight control on buffer occupancy to avoid ring buffer overflow. According to the above equations, the short time scale mechanism applies multiplicative decrease on transfer rate, as long as the ring buffer occupancy is larger than ρ'. Further more, the multiplication factor α(t) is a decreasing function of the ring buffer occupancy ρ(t), meaning that the rate controller is more and more aggressive in reducing the transfer rate as the ring buffer grows larger. In particular, once the buffer approaches full occupancy, the transfer session self-throttles almost completely at a rate close to 0.

Combined Two Time-Scale Design

FIG. 2 (b) illustrates the joint operation of the two time scale design. Notice that multiple short-time scale rate updates already take action to slow down the transfer rate before the first long-time scale mechanism kicks in. This makes the rise in ring buffer occupancy to taper off, and therefore avoids subsequent ring buffer overflow, in contrast to FIG. 2 (a). While the long time scale mechanism tracks the overall trend of I/O throughput at the end of each write operation, the short time scale mechanism actively curtails the ring buffer occupancy during a write operation. More than one short time scale rate updates could be performed if the write operation is long enough (longer than the measured RTT(t) during the write operation).

Responding to Multiple Bottlenecks

In addition to the storage I/O bottleneck, other throughput bottlenecks could appear along the end-to-end transfer path. As mentioned previously, a transfer could be bottlenecked at a network link. The proposed I/O driven control is able to co-exist with any control mechanisms that constantly adapt to such bottlenecks. For example, it can be combined with the adaptive rate control mechanism of the FASP protocol [7], as they jointly compute a rate. Another type of bottleneck is the "virtual" bandwidth cap applied to a group of users. In U.S. patent application Ser. No. 11/849,742, a virtual link control framework is described so that every user in the group can self-adjust its transfer rate so that the aggregate transfer rate conforms to the "virtual" bandwidth cap. The I/O driven rate control mechanism can also be combined with such a mechanism.

In a generic case where a transfer session embeds all three mechanisms, all three rate controllers could run in parallel and update their transfer rates independently. The overall transfer rate at a given time t, is then selected from the individual transfer rates computed by the network rate controller, the virtual link rate controller, and the I/O driven rate controller, respectively. For example, a minimal selection criterion could be used, which chooses the minimal rate computed by an individual rate controller, i.e, $$x(t)=\min\{x_{net}(t), x_{vl}(t), x_{disk}(t)\}$$

Particularly, if I/O driven rate control is not activated, we assume its computed rate is infinite, i.e., $x_{disk}(t+T)=\infty \rho(t) \leq \rho_{min}$. This effectively means there is no limitation on the transfer rate from the perspective of storage I/O, and the transfer rate is determined based on the degree of congestion on the network or at the virtual link.

The rationale of the minimal rate criterion is to limit transfer rate according to the bottleneck that is most congested. This prevents a transfer session traversing several bottlenecks from being penalized multiple times due to congestion on each bottleneck. It is shown in the prior art that congestion control schemes of this kind achieve max-min fair rate allocation (See Bartek Wydrowski, Lachlan L. H. Andrew, Moshe Zukerman, "MaxNet: A Congestion Control Architecture for Scalable Networks", IEEE Communications Letters, vol. 7, no. 10, October 2003).

Figures 3, 4:
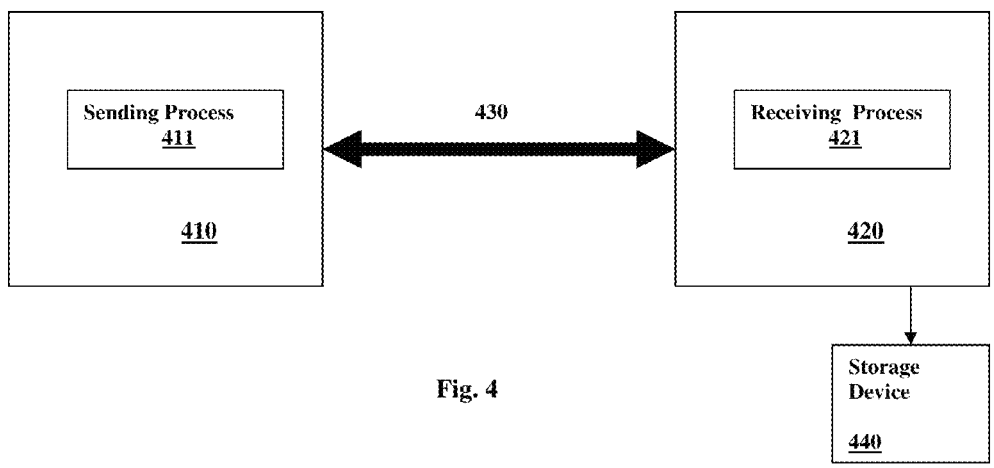
FIG. 3 is a table showing the results of a test comparison of transfer performance with and without an I/O driven rate control mechanism.
FIG. 4 illustrates an exemplary system for I/O driven rate control.

The two time scale I/O rate control as described above may be implemented as an extension to the existing FASP protocol. FIG. 3 is a table that shows a comparison of the transfer performance with and without this rate control mechanism. In particular, without such control, a FASP transfer takes long time to finish due to large amount of packet losses and reduced throughput. With I/O driven rate control turned on, the amount of packet losses can be curtailed to less than 5% and the overall throughput is sufficiently high to match the peak throughput of the disk capacity. In the mean time, when there are multiple running transfers, each of them can acquire a roughly equal sharing of the effective disk bandwidth.

Exemplary Embodiment

In an exemplary embodiment of a system and method for I/O driven rate control, illustrated by FIG. 4, a system includes a first host 410 and a second host 420 connected over a network 430, the second host being connected to a storage device 440, and a sending process 411 executable in the first host for communicating data to a receiving process 421 executable in the second host in order for the receiving process to write the data to the storage device. The sending process is configured to send data to the receiving process at a specified variable data transfer rate x(t) at any time t, wherein the receiving process is configured to store data received in a ring buffer before writing it to the storage device. A storage rate controller is incorporated into the receiving process, wherein the storage rate controller is configured to: 1) measure the current occupancy of the ring buffer, 2) calculate an updated data transfer rate x'(t) as a function of the current data transfer rate x(t), the measured current occupancy, the total size of the ring buffer, and a specified target occupancy value, and 3) communicate the updated data transfer rate to the sending process. The sending process is then configured to adjust the data transfer rate x(t) to the updated data transfer rate x'(t). The storage rate controller may be configured such that the updated data transfer rate x'(t) represents a decrease of the current data transfer rate x(t) if the measured current occupancy is greater than the specified target occupancy value.

The rate controller may be configured to compute the updated data transfer rate x'(t) after finishing a write operation to the storage device and/or compute the updated data transfer rate x'(t) at periodic intervals. In one particular embodiment, the rate controller is configured to: 1) after finishing a write operation to the storage device, compute the updated data transfer rate x'(t) from a first function of the current data transfer rate x(t), the measured current occupancy, the total size of the ring buffer, and a specified target occupancy value, and 2) at periodic intervals, compute the updated data transfer rate x'(t) from a second function of the current data transfer rate x(t), the measured current occupancy, the total size of the ring buffer, and a specified target occupancy value. The first and second functions may correspond to the updating functions for long time-scale adaptation and short time-scale adaptation as described above.

The system may include a plurality of sending and receiving processes, with each such receiving process being connected to the storage device and incorporating a storage rate controller and a ring buffer for updating the data transfer rate of its respective sending process. The sending and receiving processes may belong to a group of similar processes that together limit their aggregate data transfer rate by maintaining a virtual queue and calculating an occupancy of the virtual queue based upon their aggregate data transfer rate, and wherein each receiving process further incorporates a virtual link controller which computes a virtual link rate $x_{vl}(t)$ based on the virtual queue occupancy, and wherein each sending process adjusts its data transfer rate as a function of the virtual link rate $x_{vl}(t)$ and the updated data transfer rate x'(t) sent by the receiving process.

The receiving process may further incorporate a network rate controller configured to measure an extent of network congestion and to compute a network rate $x_{net}(t)$ based on the measured congestion, An example of a measure of network congestion is a queuing delay derived from a measured round trip delay time. The sending process then adjusts the current data transfer rate as a function of $x_{net}(t)$ and the updated data transfer rate sent by the receiving process. For example, the sending process may adjust its data transfer rate as a function of a network rate $x_{net}(t)$ calculated from the measured network congestion, the virtual link control rate $x_{vl}(t)$ calculated from the virtual queue occupancy, and the updated data transfer rate x'(t) sent by the receiving process using a minimal selection criterion as:

$$x(t) = \min\{x_{net}(t), x_{vl}(t), x'(t)\}.$$

The invention has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

What is claimed is:

1. A system, comprising:
a first host and a second host connected over a network, the second host being connected to a storage device;
a sending process executable in the first host for communicating data to a receiving process executable in the second host in order for the receiving process to write the data to the storage device, wherein the sending process is configured to send data to the receiving process at a specified variable data transfer rate x(t) at any time t, wherein the receiving process is configured to store data received in a ring buffer before writing it to the storage device;
a storage rate controller incorporated into the receiving process, wherein the storage rate controller is configured to: 1) measure the current occupancy of the ring buffer, 2) calculate an updated data transfer rate x'(t) as a function of the current data transfer rate x(t), the measured current occupancy, the total ring buffer size, and a specified target occupancy value, and 3) communicate the updated data transfer rate to the sending process;
wherein the sending process is configured to adjust the data transfer rate x(t) to the updated data transfer rate x'(t); and,
wherein the receiving process further incorporates a network rate controller configured to measure an extent of network congestion and to compute a network rate $x_{net}(t)$ based on the measured congestion, and wherein the sending process further adjust the current data transfer rate as a function of $x_{net}(t)$ and the updated data transfer rate sent by the receiving process and wherein the measure of network congestion is a queuing delay derived from a measured round trip delay time.

2. The system of claim 1 wherein the storage rate controller is configured such that the updated data transfer rate x'(t) represents a decrease of the current data transfer rate x(t) if the measured current occupancy is greater than the specified target occupancy value.

3. The system of claim 1 wherein the rate controller is configured to compute the updated data transfer rate x'(t) after finishing a write operation to the storage device.

4. The system of claim 1 wherein the rate controller is configured to compute the updated data transfer rate x'(t) at periodic intervals.

5. The system of claim 1 wherein the rate controller is configured to: 1) after finishing a write operation to the storage device, compute the updated data transfer rate x'(t) from a first function of the current data transfer rate x(t), the measured current buffer occupancy, the total size of the ring buffer, and a specified target occupancy value, and 2) at periodic intervals, compute the updated data transfer rate x'(t) from a second function of the current data transfer rate x(t), the measured current buffer occupancy, the total size of the ring buffer, and a specified target occupancy value.

6. The system of claim 4 wherein the periodic intervals correspond to a currently measured network round-trip time RTT(t).

7. The system of claim 4 wherein the periodic intervals correspond to a currently measured network round-trip time RTT(t) if RTT(t) is below a specified threshold value and correspond to a specified default value otherwise.

8. The system of claim 5 wherein the storage rate controller is configured to compute the updated data transfer rate x'(t) from a first function as:

$$x(t)' = x(t) + \frac{\gamma_{dist}}{T(t)}(\rho'B - \rho(t)B) \quad \rho(t) \geq \rho_{min}$$

when the current occupancy $\rho(t)$ is greater than or equal to a predetermined value $\rho_{min}$, where $\rho'$ is a specified target occupancy, $\gamma_{disk}$ is a weighting factor, B is a measure to the total data capacity of the ring buffer, and T(t) is the time duration since the current data transfer rate was last updated.

9. The system of claim 5 wherein the storage rate controller is configured to compute the updated data transfer rate x'(t) from a first function as:

$$x(t)' = x(t) + \frac{\gamma_{dist}}{T(t)}(\rho'B - x(t)\rho(t)\tau(t)) \quad \rho(t) \geq \rho_{min}$$

when the current occupancy $\rho(t)$ is greater than or equal to a predetermined value $\rho_{min}$, where $\rho'$ is a specified target occupancy, $\gamma_{disk}$ is a weighting factor, B is a measure to the total data capacity of the ring buffer, $\tau(t)=(B/\text{write\_size})*w(t)$ where write-size is a measure of the amount of data written during the most recent write operation and w(t) is the duration of the most recent write operation, and T(t) is the time duration since the current data transfer rate was last updated.

10. The system of claim 5 wherein the storage rate controller is configured to compute the updated data transfer rate x'(t) at periodic intervals equal to RTT(t) from a second function as:

$$x'(t) = \alpha(t)x(t)\rho(t) \geq \rho_{min}$$

$$\alpha(t) = [1-\rho(t)]/[1-\rho']$$

when the current occupancy $\rho(t)$ is greater than or equal to a predetermined value $\rho_{min}$, where $\rho'$ is a specified target occupancy.

11. The system of claim 1 further comprising a plurality of sending and receiving processes, with each such receiving process being connected to the storage device and incorporating a storage rate controller and a ring buffer for updating the data transfer rate of its respective sending process.

12. The system of claim 1 wherein the sending and receiving processes belong to a group of similar processes that together limit their aggregate data transfer rate by maintaining a virtual queue and calculating an occupancy of the virtual queue based upon their aggregate data transfer rate, and wherein each receiving process further incorporates a virtual link controller which computes a virtual link rate $x_{vl}(t)$ based on the virtual queue occupancy, and wherein each sending process adjusts its data transfer rate as a function of the virtual link rate $x_{vl}(t)$ and the updated data transfer rate x'(t) sent by the receiving process.

13. The system of claim 1 wherein the receiving process further incorporates a network rate controller configured to measure an extent of network congestion, and wherein the sending process further adjusts its data transfer rate as a function of a network rate $x_{net}(t)$ calculated from the measured network congestion, a virtual link control rate $x_{vl}(t)$ calculated from a virtual queue occupancy, and the updated data transfer rate x'(t) sent by the receiving process using a minimal selection criterion as:

$$x(t)=\min\{x_{net}(t), x_{vl}(t), x'(t)\}.$$

14. The system of claim 1 wherein the storage rate controller is configured to compute the updated data transfer rate x'(t) as:

$$x(t)' = x(t) + \frac{\gamma_{dist}}{T(t)}(\rho'B - \rho(t)B) \quad \rho(t) \geq \rho_{min}$$

when the current occupancy ρ(t) is greater than or equal to a predetermined value $\rho_{min}$, where ρ' is a specified target occupancy, $\gamma_{disk}$ is a weighting factor, B is a measure to the total data capacity of the ring buffer, and T(t) is the time duration since the current data transfer rate was last updated.

15. The system of claim 1 wherein the storage rate controller is configured to compute the updated data transfer rate x'(t) as:

$$x(t)' = x(t) + \frac{\gamma_{dist}}{T(t)}(\rho'B - x(t)\rho(t)\tau(t)) \quad \rho(t) \geq \rho_{min}$$

when the current occupancy ρ(t) is greater than or equal to a predetermined value $\rho_{min}$, where ρ' is a specified target occupancy, $\gamma_{disk}$ is a weighting factor, B is a measure to the total data capacity of the ring buffer, τ(t)=(B/write_size)*w(t) where write-size is a measure of the amount of data written during the most recent write operation and w(t) is the duration of the most recent write operation, and T(t) is the time duration since the current data transfer rate was last updated.

16. A method for transferring data from a first host to a second host connected over a network, the second host being connected to a storage device, comprising:
 executing a sending process in the first host for communicating data to a receiving process executing in the second host in order for the receiving process to write the data to the storage device, wherein the sending process sends data to the receiving process at a specified variable data transfer rate x(t) at any time t, and wherein the receiving process stores data received in a ring buffer before writing it to the storage device;
 executing a storage rate controller incorporated into the receiving process, to: 1) measure the current occupancy of the ring buffer, 2) calculate an updated data transfer rate x'(t) as a function of the current data transfer rate x(t), the measured current occupancy, and a specified target occupancy value, and 3) communicate the updated data transfer rate to the sending process; and,
 adjusting the data transfer rate x(t) to the updated data transfer rate x'(t); and
 computing the updated data transfer rate x'(t) from a first function as:

$$x(t)' = x(t) + \frac{\gamma_{dist}}{T(t)}(\rho'B - \rho(t)B) \quad \rho(t) \geq \rho_{min}$$

when the current occupancy ρ(t) is greater than or equal to a predetermined value $\rho_{min}$, where ρ' is a specified target occupancy, $\gamma_{disk}$ is a weighting factor, B is a measure to the total data capacity of the ring buffer, and T(t) is the time duration since the current data transfer rate was last updated.

17. The method of claim 16 further comprising:
 after finishing a write operation to the storage device, computing the updated data transfer rate x'(t) from a first function of the current data transfer rate x(t), the measured current buffer occupancy, the total size of the ring buffer, and a specified target occupancy value; and
 at periodic intervals, computing the updated data transfer rate x'(t) from a second function of the current data transfer rate x(t), the measured current buffer occupancy, the total size of the ring buffer, and a specified target occupancy value.

* * * * *